Figure 1:
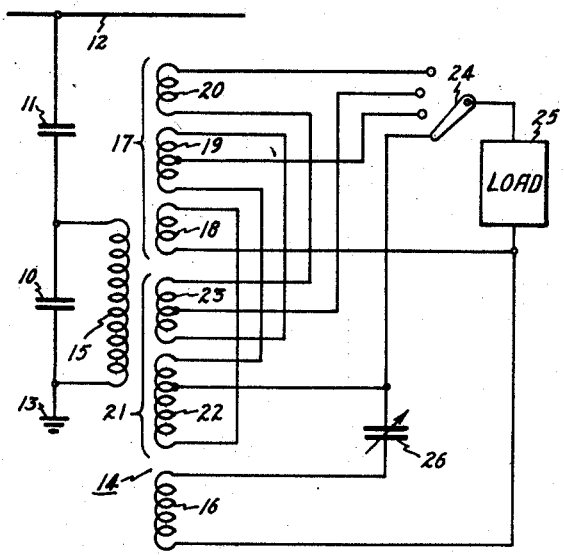

March 29, 1960   R. F. GOODMAN   2,930,964
TRANSFORMER FOR POTENTIAL DEVICE
Filed Aug. 22, 1955

Inventor
Robert F. Goodman,
by Gilbert P. Tarleton
His Attorney.

United States Patent Office 2,930,964
Patented Mar. 29, 1960

2,930,964

TRANSFORMER FOR POTENTIAL DEVICE

Robert F. Goodman, Pittsfield, Mass., assignor to General Electric Company, a corporation of New York Application August 22, 1955, Serial No. 529,823

8 Claims. (Cl. 323—48)

This invention relates to transformers, and more in particular to an improved adjustable ratio and reactance transformer. The transformer of this invention is especially adapted to provide the necessary adjustable ratio and reactance settings in a potential device such as is commonly employed in combination with a high voltage condenser bushing.

In certain electrical circuits it is desirable to provide means for adjusting the magnitude and phase of an output voltage independently of one another, in order to retain a proportionality and constant phase relationship between the output voltage and an input voltage. For example, low voltage capacitance taps of a capacitance voltage divider on condenser bushings have frequently been employed to obtain a relatively low voltage proportional to the line voltage at the terminals of stationary induction electrical apparatus. The phase and amplitude of the voltage at the capacitance tap is usually not the same as the ultimate utilization voltage, and therefore, it is customary to connect an adjustable potential transformer or a potential device between the load circuit and the low voltage capacitance tap. It is not practical to use a fixed reactance value in the potential device since it is difficult to manufacture the bushings to have uniform capacitances. The output of the transformer is conventionally connected to operate relays, synchroscopes, voltmeters, indicating lamps, wattmeters, or similar instruments requiring a potential source having an essentially constant ratio and phase relation with respect to the high voltage circuit.

In a typical circuit of this type, a potential transformer is provided with a magnetic core having a primary winding, a loosely coupled tapped secondary winding, and a closely coupled tertiary winding. The primary winding is connected between the capacitance tap on a condenser bushing and a ground reference potential point. The loosely coupled tapped secondary winding of a transformer is connected to a burden or load circuit, and a series combination of a variable capacitor and the closely coupled tertiary winding of the transformer is connected in parallel with a portion of the loosely coupled secondary winding. In this circuit the magnitude of the output voltage of the transformer may be varied by changing the taps on the loosely coupled secondary winding and the reactance of the transformer may be varied by adjusting the capacity of the variable capacitor.

It can be shown that the equivalent series capacitance of the capacitance voltage divider with respect to the input of the potential device is equal to the sum of the two capacitances between the tap and the other two terminals of the divider. In order that the load voltage of the potential device be in phase with and proportional to the line voltage, it is customary to tune the circuit by means of the variable capacitance to make the effective input inductive reactance of the potential transformer primary winding equal to the equivalent series capacitance of the capacitance voltage divider.

In the previously described circuit, the settings of voltage ratio by means of tap changes on the loosely coupled secondary winding and the settings of transformer reactance by means of varying the capacitance are not independent of each other, and in order to obtain desirable settings it is necessary continuously to alternate ratio and phase angle settings until a small change in capacitance value produces no change in the output voltage and a change in ratio by one step in either direction produces an equal change in the output voltage. In practice, the necessity for such adjustments to compensate for the dependency of the settings upon each other has been found to be undesirable. It has also been found that it was necessary to design the primary coil of the potential transformer for minimum input reactance of the reactance range desired, since insertion of a capacitance in series with the tightly coupled secondary winding increases the effective input inductive reactance. Variations in design to yield optimum weight which resulted in an increase in the primary winding reactance could not be readily compensated for to reduce the input reactance since the ratio of turns of the primary winding to turns of the loosely coupled winding determines the transformer ratio. As a result such transformers could not be designed from the standpoint of minimum weight or cost.

The disadvantages of the previously described circuit have been partially solved by the adjustable reactance transformer disclosed in the United States Letters Patent Number 2,440,540, which issued on an application of J. W. Farr and is assigned to the present assignee. In this transformer the closely coupled secondary winding and the loosely coupled secondary winding are connected in series in the burden or load circuit, and no reactance adjustment capacitor is employed. The effective input reactance of the transformer is adjusted by varying the ratio of turns of the closely coupled and loosely coupled secondary windings while maintaining the sum of the turns in these two windings constant, and the voltage ratio is adjusted by varying the number of turns of two secondary windings while maintaining the ratio of the active turns of the two secondary windings constant. The ratio taps on the secondary winding are so arranged that variations in their effective turns at constant ratio does not materially vary the space occupied by the active portions of the windings, in order that ratio tap changes do not have any effect upon the effective input reactance. Since the total number of active secondary winding turns does not vary with the reactance settings, the voltage ratio of the transformer does not depend upon the reactance settings. It has been found however, that there are several disadvantages in the adjustable reactance transformer disclosed in the previously mentioned Farr patent. From a practical standpoint a great disadvantage results from the fact that a bushing is usually required on the transformer for each ratio and reactance tap, and that the cost of the transformer is thereby increased. Even if a multiprong connector is employed, the cost of the transformer is increased as the number of leads that must be brought out is increased. As another disadvantage, the number of reactance settings is limited by the number of taps on the transformer and therefore a fine adjustment is not usually obtainable. A still further disadvantage resides in the fact that, if the ratio setting taps are designed to maintain a constant ratio of turns of the two secondary windings at a given reactance setting, the tap spacings will not be correct to maintain the required ratio of turns of the two windings at other reactance settings, and therefore the ratio will be independent of reactance setting at only one ratio setting.

It is therefore an object of this invention to provide an improved transformer having variable ratio and input reactance.

A further object is to provide a transformer system having means for varying ratio and input reactance substantially independently of one another and having a minimum number of terminals.

A still further object of this invention is to provide a potential device having minimum weight, means for varying the ratio, and means for continuously varying the input reactance, wherein the settings of ratio and reactance are substantially independent of one another.

Briefly stated, in accordance with one aspect of my invention, I provide a transformer having a primary winding, a first secondary winding closely coupled to the primary winding, a second secondary winding loosely coupled to the primary winding, and a tertiary winding is closely coupled to the primary winding. The first secondary winding and the second secondary winding are each divided into a plurality of groups of turns and connected in series. The series connected windings are provided with a plurality of taps, and the taps and number of turns in each winding section are so proportioned that the ratio of the number of turns of the second secondary winding to the number of turns of the first secondary winding between one end of the combined secondary windings and any of the taps is constant. The first secondary winding and the second secondary winding are also wound in such a manner that changing of the taps does not materially affect the space occupied by the active portion of these windings. In a typical application of the transformer of my invention, a variable capacitor is connected in series with the tertiary winding, and this series combination is connected in parallel with either the loosely coupled secondary winding, or a portion of the closely coupled and loosely coupled secondary winding. The primary winding is connected to a capacitance voltage divider such as a tapped condenser bushing, and the series combination of the tapped first and second secondary windings is connected to a load circuit.

My invention will be better understood from the following description taken in connection with the accompanying drawing, and its scope will be pointed out in the appended claims.

Figure 2:
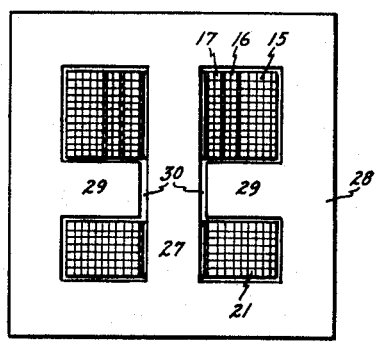
Figure 3:
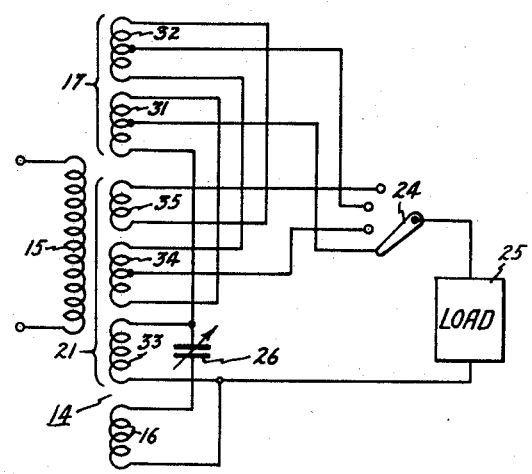

In the drawing:

Figure 1 is a circuit diagram of the transformer of my invention as employed in a potential device connected between a capacitance voltage divider and a load circuit, Figure 2 is a partially cross sectional view of the transformer of Figure 1 illustrating the relative positions of the primary and secondary windings in a typical construction thereof, and Figure 3 is a modified form of a portion of the circuit of Figure 1.

Referring now to the drawing, and more in particular to Figure 1, therein is shown a capacitance voltage divider comprised of capacitors 10 and 11 connected in series between a high voltage conductor 12 and a ground reference 13. The capacitor voltage divider may comprise a high voltage condenser bushing of the type having a low voltage capacitor tap. A transformer 14 is provided having a primary winding 15, a closely coupled tertiary winding 16, a closely coupled first secondary winding 17 comprised of groups of turns 18, 19, and 20, and a loosely coupled second secondary winding 21 comprised of groups of turns 22 and 23. The primary winding 15 is connected in parallel with the capacitor 10. The groups of turns of the first secondary winding 17, and the second secondary winding 21 are connected in series in the order 18, 22, 19, 23, and 20. The groups of turns 22, 23, and 19 are provided with taps which are connected to a ratio switch 24, and one end of the winding 20 is also connected to the ratio switch. A burden or load circuit 25 is connected between the arm of the ratio switch and one end of the winding 18. A variable capacitor 26 is connected in series with the tertiary winding 16, and this series combination is connected in parallel with the group of turns 18 and a portion of the group of turns 22.

In order that changing the position of the ratio switch 24 does not substantially affect the effective input reactance of the transformer, the number of turns and the location of the taps in the secondary windings 17 and 21 are preferably correlated such that the active portions of these windings occupy a constant space, and the ratio of active number of turns in the closely coupled secondary winding 17 to the active number of turns in the loosely coupled secondary winding 21 remains substantially constant regardless of the position of the ratio switch 24. The input reactance of the transformer may be varied by changing the setting on the variable capacitor 26, and this setting does not substantially affect the ratio of the transformer. A slight amount of dependency of ratio upon the reactance setting is usually tolerable, however, since if the reactance setting is made first, it will not have to be later changed because the input reactance of the transformer is not dependent upon the ratio setting. In actual practice it may not be economical to construct the transformer to maintain the active area of the secondary windings absolutely constant regardless of the tap position. In this event there may be a slight dependency of reactance upon the ratio setting and consequently a few ratio and reactance adjustments may be necessary to obtain the desired transformer characteristics. The reduction in cost of the transformer, however, may justify the necessity of making a few minor adjustments. If the capacitor and tertiary winding are in parallel with the loosely coupled winding, the capacitor will be effectively in parallel with the relatively high leakage reactance reflected to the primary winding from the loosely coupled secondary winding, and variation of the capacitor will have a greater effect upon the input reactance and thus a larger reactance range is obtainble than if the capacitor were in parallel only with a closely coupled secondary winding which reflects a relatively low leakage reactance.

The construction of the transformer 14 of Figure 1 may be more clearly seen in Figure 2, wherein is shown the primary winding 15 wound concentrically over the closely coupled secondary winding 17 and the tertiary winding 16 and coaxially with the loosely coupled secondary winding 21 on the center leg 27 of the magnetic core 28. The primary winding 15 and the closely coupled windings 16 and 17 are axially separated from the loosely coupled secondary winding 21 by means of magnetic shunts 29 having gaps 30 between the core 28 and the shunts 29. It is preferred that the gaps 30 be located between the shunt members 29 and the center leg member 27 rather than between the shunt members 29 and the outside of the core 28 in order to reduce the effect of losses resulting from a magnetic field having high flux density in the proximity of the tank or casing of magnetic material surrounding the transformer.

In the modification of my invention illustrated in Figure 3, the closely coupled secondary winding 17 has two groups of turns 31 and 32, and the loosely coupled secondary winding 21 has three groups of turns 33, 34 and 35. In this modification the groups of turns of windings 17 and 21 are connected in series in the order 33, 31, 34, 32 and 35. Taps from the windings 31, 34, and 32, and one end of the groups of turns 35 are connected to the ratio switch 24. The tertiary secondary winding and the serially connected variable capacitor 26 are connected in parallel with the section 33 of loosely coupled winding 21. The core and the coils of the transformer of this invention may be designed from the standpoint of obtaining minimum core and copper weight, and therefore minimum cost, without regard to any predetermined limit of reactance of a primary winding 15. This is possible since the effective input reactance of the transformer may be either increased or decreased by design changes of the ratio of number of turns in the closely coupled winding 17 to the number of turns in the loosely coupled winding 21, without affecting the ratio. Therefore the number of turns in each winding and the weight of the core may be adjusted to give optimum weight for given transformer characteristics. Thus if the number of primary winding turns is increased to obtain minimum weight, the increase in effective input reactance may be compensated for by varying the ratio of turns of the first and second secondary windings.

Since the variable capacitor 26 employed to vary the input reactance of the transformer requires only two terminals, and the ratio switch requires only one terminal for each tap position and one terminal for the arm thereof, only a minimum number of leads need to be brought out of the transformer casing, and therefore only a minimum number of bushings is required on the transformer casing.

It will be understood, of course, that, while the forms of the invention herein shown and described constitute preferred embodiments of my invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. An adjustable transformer comprising a magnetic core having a primary winding, a secondary winding comprised of alternate serially connected groups of turns loosely and closely coupled to said primary winding, a tertiary winding closely coupled to said primary winding, and a plurality of taps on said secondary winding.

2. An adjustable transformer comprising a magnetic core having a primary winding, a secondary winding comprised of alternate serially connected groups of turns loosely and closely coupled to said primary winding, a tertiary winding closely coupled to said primary winding, and a plurality of taps on said secondary winding, said taps and the turns of said secondary winding being proportioned to maintain a substantially constant ratio of loosely coupled to closely coupled turns between each of said taps and one end of said secondary winding.

3. An adjustable transformer comprising a magnetic core having a primary winding, a secondary winding comprised of alternate serially connected groups of turns loosely coupled and closely coupled to said primary winding, a tertiary winding closely coupled to said primary winding, and a plurality of taps on said secondary winding, said taps and the turns of said secondary winding being proportioned to maintain the active space occupied by said secondary winding substantially constant and to maintain a substantially constant ratio of loosely coupled to closely coupled turns between each of said taps and the end of said secondary winding.

4. An adjustable transformer comprising a magnetic core having a primary winding, a secondary winding comprised of alternate serially connected groups of turns loosely coupled and closely coupled to said primary winding, a tertiary winding closely coupled to said primary winding, and a plurality of taps on said secondary winding, said taps and the number of turns of said secondary winding being proportioned to vary the ratio of the number of active turns of said secondary winding to the number of turns of said primary winding, to maintain substantially constant the active space occupied by said secondary winding and to maintain a substantially constant ratio of loosely coupled to closely coupled turns between each of said taps and one end of said secondary winding.

5. An adjustable transformer system comprising a transformer having a magnetic core with a primary winding, a secondary winding comprised of alternate serially connected groups of turns closely and loosely coupled to said primary winding, and a tertiary winding closely coupled to said primary winding, a plurality of taps on said secondary winding, a variable capacitor connected in series with said tertiary winding, said series connected capacitor and tertiary winding being connected in parallel with a portion of said secondary winding, said taps and the turns of said secondary winding being proportioned to maintain a constant ratio of the number of loosely coupled to closely coupled turns between each of said taps and one end of said secondary winding.

6. An adjustable transformer system comprising a transformer having a magnetic core with primary winding, a second secondary winding comprised of alternate serially connected groups of turns closely and loosely coupled to said primary winding, and a tertiary winding closely coupled to said primary winding, a plurality of taps on said secondary winding, means for selectively connecting a load circuit between said taps and one end of said secondary winding, said taps and the number of turns of said secondary winding being proportioned so that the active space occupied by said secondary winding is substantially constant and the ratio of loosely coupled to closely coupled turns is substantially constant regardless of the tap position, and a variable capacitor connected in series with said tertiary winding, said series connected capacitor and tertiary winding being connected in parallel with a portion of said secondary winding.

7. An adjustable transformer comprising a magnetic core having a primary winding, first and second secondary windings closely coupled and loosely coupled respectively to said primary winding, a tertiary winding closely coupled to said primary winding, said secondary windings each being comprised of a plurality of groups of turns, said groups of turns of said secondary windings being connected in series with adjacent groups of turns being of different windings, and a plurality of taps on said groups of turns, said taps and the number of turns in each of said groups being proportioned to maintain a constant ratio of the number of turns of said first secondary winding to the number of turns of said second secondary winding between one end of the series connected windings and each of said taps.

8. An adjustable transformer comprising a magnetic core having a primary winding, first and second secondary windings closely coupled and loosely coupled respectively to said primary winding, a tertiary winding closely coupled to said primary winding, said secondary windings each being comprised of a plurality of groups of turns, said groups of turns being connected in series with adjacent groups of turns being of different secondary windings, and a plurality of taps on said groups of turns, said taps and the number of turns in each of said groups being proportioned to permit variation of the ratio of the total number of active turns of the secondary windings to the number of turns in the primary winding without affecting the ratio of the number of active turns of said first secondary winding to the number of active turns of said second secondary winding, and without substantially varying the active space occupied by said first and second secondary windings.

References Cited in the file of this patent

UNITED STATES PATENTS

| | | |
|---|---|---|
| 1,706,193 | Stephens | Mar. 19, 1929 |
| 2,276,032 | Gibbs | Mar. 10, 1942 |
| 2,310,097 | Langguth et al. | Feb. 2, 1943 |
| 2,313,950 | Langguth et al. | Mar. 16, 1943 |
| 2,358,631 | Garin | Sept. 19, 1944 |
| 2,440,540 | Farr | Apr. 27, 1948 |